United States Patent [19]

Hickman et al.

[11] Patent Number: 5,600,353

[45] Date of Patent: Feb. 4, 1997

[54] METHOD OF TRANSITIONING BETWEEN INK JET PRINTING MODES

[75] Inventors: Mark S. Hickman; Bruce A. Axten, both of Vancouver, Wash.

[73] Assignee: Hewlett-Packard Company, Palo Alto, Calif.

[21] Appl. No.: 397,295

[22] Filed: Mar. 1, 1995

[51] Int. Cl.$^6$ .................. B41J 2/15; B41J 2/21; B41J 2/145
[52] U.S. Cl. ............................... 347/43; 347/40
[58] Field of Search .................. 347/43, 40, 15

[56] References Cited

U.S. PATENT DOCUMENTS

| 5,371,531 | 12/1994 | Rezanka et al. | 347/43 |
|---|---|---|---|
| 5,455,610 | 10/1995 | Harrington | 347/43 |

FOREIGN PATENT DOCUMENTS

| 0595651 | 5/1994 | European Pat. Off. . |
|---|---|---|
| 0595657 | 5/1994 | European Pat. Off. . |
| 0608105 | 7/1994 | European Pat. Off. . |

Primary Examiner—Benjamin R. Fuller
Assistant Examiner—Thinh Nguyen
Attorney, Agent, or Firm—H. Brian Davis

[57] ABSTRACT

A method of generating an image on a printable surface from a stream of incoming print data containing data of a first data type for generating an image of a first image type and containing data of a second data type for generating an image of a second image type, the method comprising the following steps. While printing in a first mode, depositing a first partial density image swath having a first swath width on the printable surface to overlap at least a portion of a partial density image swath previously printed on the surface, thereby generating a shingle tab extending from the previous swath having a first length. After depositing the first swath, the surface is advanced by a first amount. While printing in the first mode, incoming print data is scanned to determine whether the incoming print data includes the second data type. If so, there is a transition to a second print mode, which includes depositing a second partial density image swath having a second swath width different from the first swath width on the printable surface to overlap at least a portion of a partial density image swath previously printed on the surface, and generating a shingle tab extending from the previous swath having a second length different from the first length. After depositing the second swath, the surface is advanced by a second amount different from the first advance amount.

16 Claims, 6 Drawing Sheets

METHOD OF TRANSITIONING BETWEEN INK JET PRINTING MODES

FIELD OF THE INVENTION

This disclosure relates to color ink jet printing techniques, and more particularly to printing techniques in printers using black ink in addition to color inks.

BACKGROUND AND SUMMARY OF THE INVENTION

Color ink jet printers generally use cyan, yellow, and magenta inks to generate a full range of colors in a printed image. Many such printers use a separately replaceable black ink cartridge to enhance the accuracy of color image tones, and to generate portions of the output containing text and other black images. Because the black cartridge contains only one ink color, it may have an extended linear array of nozzles; given a limited number of data input lines to the cartridge, it may print a relatively wide swath in a single pass across a page. In contrast, the color cartridge must have independent inputs for each of the three colors. For the same given limited number of data inputs, a much narrower swath of color ink may be printed in a single pass. Therefore, the printing throughput rate is much slower for color printing than for black-only printing.

Ink jet printers achieve improved print uniformity by printing overlapping partial density swaths in a process known as "shingling." During the typical two-pass shingled printing, each swath prints only every other dot row of the final image, and every portion of the resulting fully printed output will have been printed with ink contributed by two passes of the print head. By this approach, a lower half of each new swath interlaces and fills in the remaining incomplete upper half of the previous swath, and provides a new extending partial density portion to be completed by pan of the next swath. Three- or four-pass shingling follows the same principle, providing even better print quality with slower printing speed.

If an area is printed by more passes than required, the excess ink will create a non uniformity. Therefore, efforts in existing printers simply to change feed rates in transition between color and black-only modes would result in over inking when switching to a slower feed rate for color printing, and under inking when changing to a faster feed rate.

Some existing printers provide full speed black-only printing for pages containing no color data, and revert to the slower color rate only on pages containing at least some color data. Other printers may use the faster black-only rate on a strictly limited class of pages including color images. Such a page must include a region that contains no color data, that extends the full page width, and that is separated from color-containing regions above and below by an unprinted horizontal white band of a nominal width. These requirements are so limited that there are common circumstances in which a largely black-only page containing only a minimal amount of color data must be printed entirely at the slower color throughput rate. For instance, a spread sheet having only one data cell highlighted in color, and the remaining text and grid printed in black without horizontal white bands, would be printed entirely at the slower rate.

The method disclosed herein overcomes these disadvantages by providing a method of generating an image on a printable surface from a stream of incoming print data containing data of a first data type for generating an image of a first image type and containing data of a second data type for generating an image of a second image type, the method comprising the following steps. While printing in a first mode, depositing a first partial density image swath having a first swath width on the printable surface to overlap at least a portion of a partial density image swath previously printed on the surface, thereby generating a shingle tab extending from the previous swath having a first length. After depositing the first swath, the surface is advanced by a first amount. While printing in the first mode, incoming print data is scanned to determine whether the incoming print data includes the second data type. If so, there is a transition to a second print mode, which includes depositing a second partial density image swath having a second swath width different from the first swath width on the printable surface to overlap at least a portion of a partial density image swath previously printed on the surface, and generating a shingle tab extending from the previous swath having a second length different from the first length. After depositing the second swath, the surface is advanced by a second amount different from the first advance amount.

BRIEF DESCRIPTION OF THE DRAWINGS

FIG. 1a–1d schematic views of an ink jet printer status according to the method of the present invention illustrating sequential steps of printing with normal general graphics quality in a transition from color printing to black-only printing.

FIG. 1 shows a color ink jet status diagram 10 having a color print head nozzle array bar 12, a black print head nozzle array bar 14, and a printer output display window 16. The diagram 10 serves as a snapshot of printer operation showing active ink nozzle ranges used for the current pass of the print heads over the printer media, the resulting output after that pass, and the distance by which the media is to be advanced after the pass. The diagram serves as an identifying key to the similar diagrams that are discussed below to illustrate various printer sequences.

Figure 1:
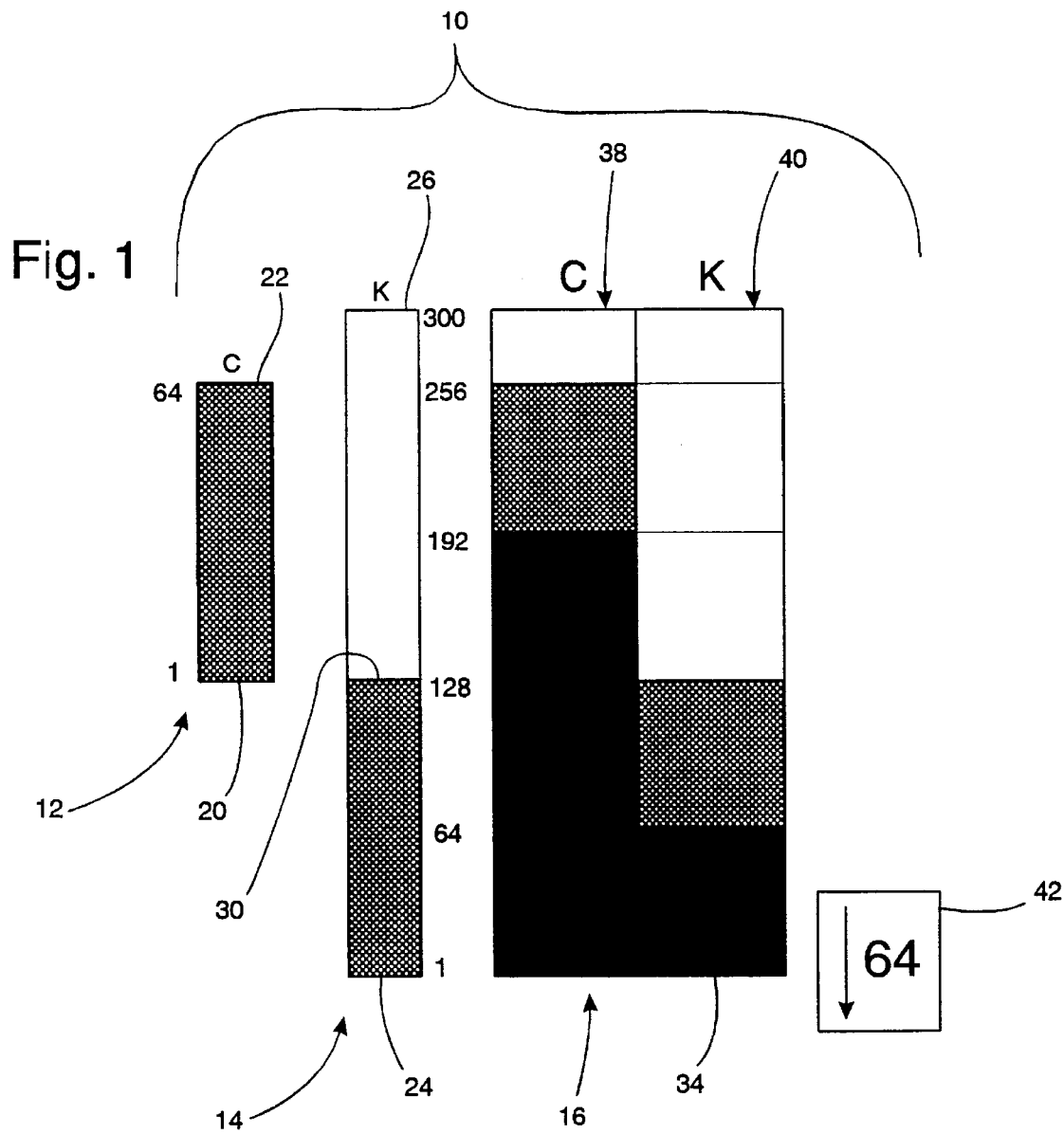
FIG. 1 is a schematic view providing a snapshot of an ink jet printer status showing the activity status of printer nozzle arrays and the resulting printed output at a selected stage of printing.

The diagram represents steady state color printing, in which all of the color array 12 is active, as shown by the shading, and a lower portion of the black array 14 is active, as shown by similar shading. The diagram represents a printer operating in the normal graphics mode, which uses two pass shingling with 50% density of color and of black printing on each pass, and with 50% overlap of adjacent passes. After each pass, the media advances by a distance equal to half of the length of the active portion of either array.

The color nozzle bar or array 12 represents a color ink jet cartridge carrying three ink colors (cyan, yellow, magenta,) and having a vertical array of 64 nozzles for each color. This yields a total of 192 separately addressable ink jet printing nozzles on the color cartridge. Each row of nozzles extends the length of the array, such that they form three parallel rows. The color nozzles in each array are spaced at 300 nozzles per inch, so that each color may print a swath of up to $^{64}/_{300}$ inch or 0.213 inch on a single traverse of a sheet of printer media. In practice, each array of nozzles is not a single straight line, but a pair of closely adjacent lines with alternating nozzles positioned in alternate lines. This creates a zig zag pattern that permits the nozzles to be positioned with a closer vertical spacing for high resolution printing without being positioned impractically close to the adjacent nozzles.

Although the different colors and individual nozzles are in fact addressed independently to permit printing of fine details in a wide range of colors, the illustrated color nozzle array bar 12 is simplified for clarity as if the printer output required the printing of either a block of solid color of all three colors where any color printing occurs, or no color printing in other areas. In actual use some active nozzles may not actually be used when a pixel of that color is not required at a particular location. The color array 12 indicates by the shaded portion which segment of the array is active. In this case, the entire bar is active. The array is labeled with a "1" at its lower end 20 to indicate the first nozzle, and a "64" at the upper end 22 to indicate the last nozzle. This may be described as having nozzles 1–64 active.

To provide improved quality printing, shingling is used as discussed above to create overlapping partial density swaths of printing, concealing the possible seam lines between swaths. During shingling, every second, third, or fourth nozzle may be active, providing print densities of 50%, 33.3%, and 25% respectively for a single pass of the print head over the media sheet. Two passes are required for complete printing at 50% density, three passes at 33.3%, and four passes at 25%. The density in this case of two pass shingling is 50%. Nonetheless, the active range is still indicated as 1–64 for clarity. In the drawings, the darkness of the shading indicates the density of printing.

The black nozzle array bar 14 represents a black ink jet cartridge carrying only black ink and having a vertical array of 300 separately addressable nozzles. The black array extends the length of the bar, with nozzles spaced at 600 nozzles per inch, so that it may print a black swath of up to $^{300}/_{600}$ inch or 0.5 inch on a single traverse of a sheet of printer media. The line of black nozzles is also arranged in a zig zag line like the color nozzles. The black array 14 is parallel to the color array 12, and similarly traverses the media sheet shown in the output window 16 in a direction perpendicular to the long axis of the array, and parallel to the plane of the window 16. The black array is positioned so that its lower end 24 extends beyond the color array in the lower direction by a length at least equal to the length of the color array, and so that its upper end 26 extends beyond the color array in the upper direction by $^{44}/_{600}$ inch, or 0.073 inch. Hereinafter, lengths given as integers without units are intended as six hundredths of an inch, or an equivalent length of the same quantity of adjacent black nozzles.

The black array is labeled "1" for the first nozzle at the lower end 24, "64" for the 64th nozzle midway between the lower end and at a point registering with the lower end 20 of the color array, "128" for the nozzle immediately below the range of black nozzles registered with the color array, "192" for the mid point of black nozzles registered with the color array, "256" for the nozzle registered with the upper end 22 of the color array, and "300" for the uppermost black nozzle.

The black array is shown in FIG. 1 as having only nozzles 1–128 in the active state by the shaded region 30, and at 50% density. All black nozzles (#129–256) registered with the color array 12 are inactive to avoid the undesirable bleeding and other interaction of the wet inks that may occur if simultaneously applied to overlap on a single pass. The diagram 10 illustrates the function of a printer that operates on the rule that those black nozzles in horizontal registration with active color nozzles must be inactivated to avoid bleeding. Because print media moves in a downward direction, areas requiring both black and color are printed with all passes of color first, then with black only on a subsequent pass or passes.

The print window 16 depicts the portions of a media sheet that are being printed, that have recently been printed, or that are about to be printed. Because media is fed in a downward direction in the diagram, the upper end 32 of the window reveals media that has just entered the window, and the lower portion 34 shows media that is about to exit the window. The width of the window is much less than that of a sheet of media, but accurately represents the printed output, which is uniform across the width of the sheet in this simplified solid color and black example. The left column 38 of the window 16 is labeled "c" at the top to indicate color printing output, and the right column 40 is labeled "k" for black printing output. These are shown as separate columns for clarity, although the black and color printing would normally be superimposed when printing solid blocks of black and color over an entire sheet. The print window 16 is ruled with horizontal grid lines registered just above nozzles 64, 128, 192, and 256 of the black array 14. The partially shaded region in the right column 40 is a "shingle tab" 46 of partial density, yet to be finished on the next pass. The black region below the shingle tab is fully printed. An advance or feed indicator 42 displays a numeral (in this instance 64) indicating the distance by which the media is to be advanced after the paper is printed with the shaded portions shown in the nozzle array bars 12, 14. The advance distance is given in number of black nozzles, or in six-hundredths of an inch. In this case, the feed amount of 64 is 0.107 inches. The downward arrow indicates a downward feed direction, which is consistent with all printer functions.

FIGS. 1a–4g illustrate four different sequences used for transitioning between one type of steady state printing (color or black-only) and the other. The first two sequences illustrate normal general graphics printing, which provides a rapid printing rate with good output quality. The second two sequences illustrate premium output quality printing, with a slower printing rate and premium output quality. Black ink is printed both during color printing mode and during black-only mode, although the illustrated methods would remain effective even if black were not printed during color printing.

In all sequences, the data received by the printer is stored in printer memory, and is scanned in advance before the next print pass to determine whether or not color is present in upcoming print data. This determines whether the printing may continue in the current state, or if it must enter one of the transition modes discussed below. Even during the transition sequences described below, the data is scanned before each pass to determine if the sequence should be aborted and printing returned to the previous steady state mode.

Color to Black-only (normal general graphics mode)

In the normal general graphics mode, two pass shingling is used, with a print density of 50% throughout for both color and black printing. While printing color in the steady state as show in FIG. 1a, the printer scans the upcoming data to determine if color data will be present anywhere within the color nozzle range on the next pass (i.e. within the range of color nozzles 1–64, or a distance of $^{128}$/$_{600}$ inch.) If so, the next pass is again printed in the steady state, the sheet is advanced by 64, and the scanning step is repeated for each next path until a transition is required.

Figures 1A, 1B, 1C, 1D:
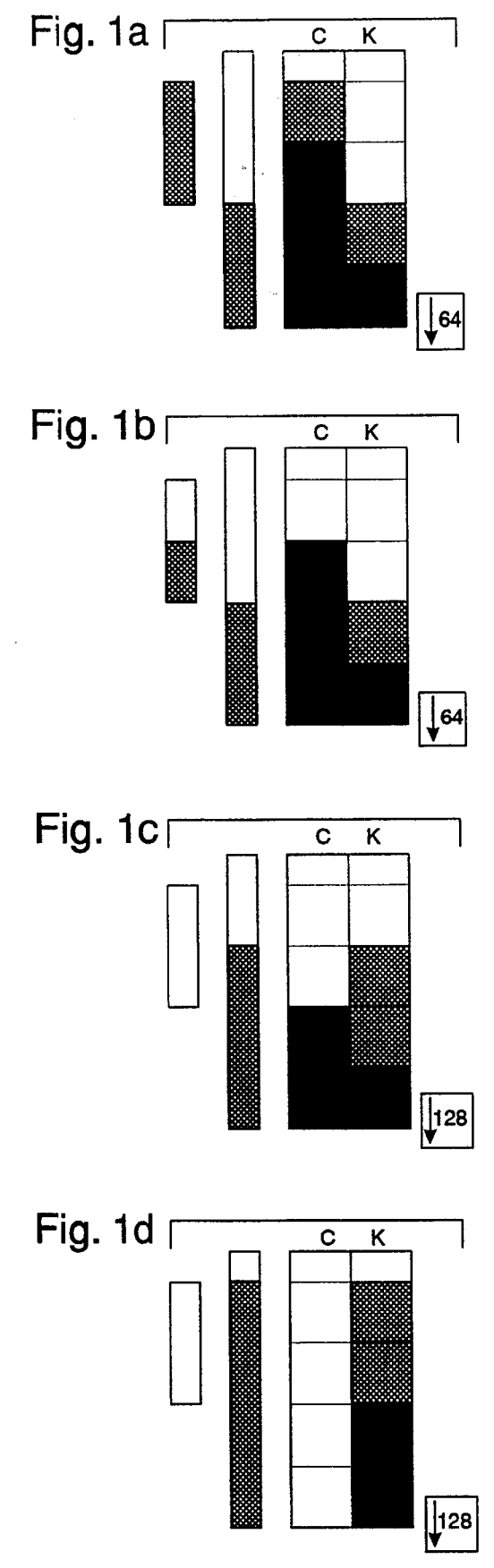

FIG. 1a—Color Steady State

Active color nozzle range: 1–64

Active black nozzle range: 1–128

Advance distance after print pass: 64

If a data scan does not show color in the next range of color nozzles, then a transition to black only printing begins. In FIG. 1b, the lower half of the color array is providing the second pass to finish the shingling of the last color data, and the process is otherwise the same as the color steady state of FIG. 1a.

FIG. 1b—Color to Black-only Transition

Active color nozzle range: 1–32

Active black nozzle range: 1–128

Advance distance after print pass: 64

In FIG. 1c, the last of the current color printing has been completed, and the active black print range is increased to create an extending 50% density shingle tab having a length of 64.

FIG. 1c—Color to Black-only Transition

Active color nozzle range: none

Active black nozzle range: 1–192

Advance distance after print pass: 64

In FIG. 1d, the printing has entered the black-only steady state. The black shingle tab is moved into position for a nearly full width black swath, after which the advance distance is doubled relative to the color mode, for rapid printing.

FIG. 1d—Black-only Steady State

Active color nozzle range: none

Active black nozzle range: 1–256

Advance distance after print pass: 128

Black-only to Color (normal general graphics mode)

Figure 2A:
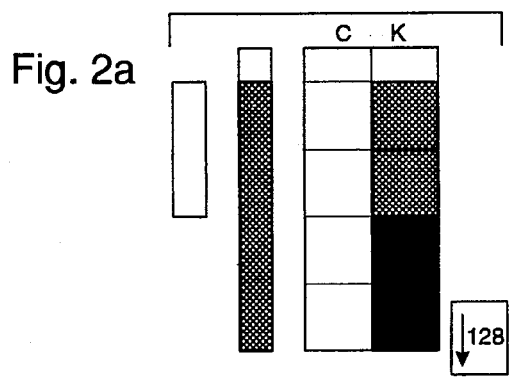
FIGS. 2a–2c and 2b'–2d' are schematic views of an ink jet printer status according to the method of the present invention illustrating sequential steps of printing with normal general graphics quality in a transition from black-only printing to color printing.

Again, in the normal general graphics mode, two pass shingling is used, with a print density of 50% throughout for both color and black printing. Printing black-only in the steady state uses an advance rate of 128 until a transition is indicated by a data scan at each pass. As shown in FIG. 2a, the printer scans the upcoming data to determine if color data will be present anywhere within the entire color nozzle range on the next pass (i.e. within the range of color nozzles 1–64, given the advance rate of 128 per pass.) If no color data is detected in this range, the next pass is printed in the steady state, and the cycle is repeated.

FIG. 2a—Black-only Steady State

Active color nozzle range: none

Active black nozzle range: 1–256

Advance distance after print pass: 128

Figure 2B:
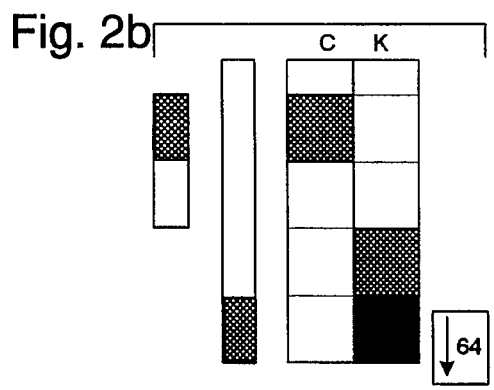
Figure 2B:
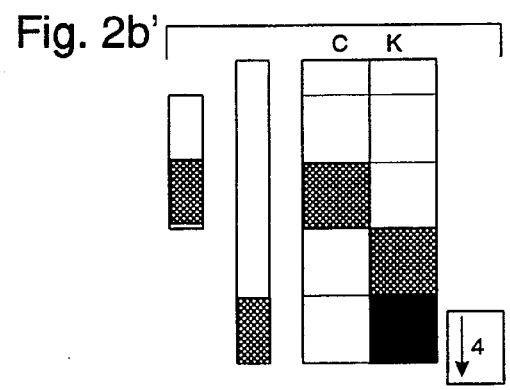
Figure 2C:
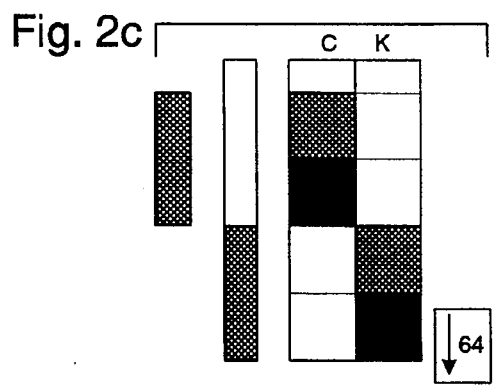
Figure 2C:
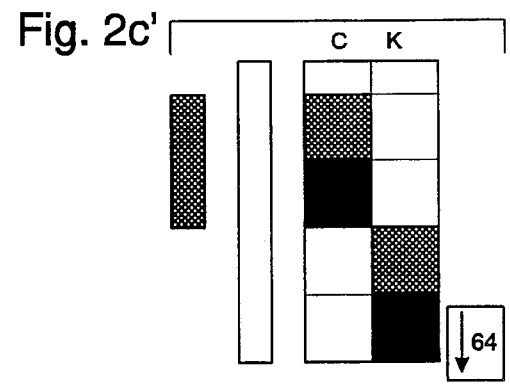
Figure 2D:
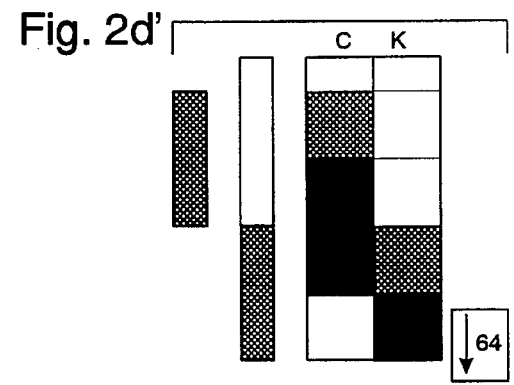

If a data scan does show color in the next range of color nozzles, then a transition to color printing begins. In fact, all scans of the next color range may look beyond the indicated range by two color rows, providing a safety margin that may be used in circumstances discussed below with respect to FIG. 2b'. In the preferred embodiment, the data is scanned after the full advance of 128. Therefore, data may appear anywhere within the color nozzle range. If data appears only in the upper half of the range, the sequence of FIGS. 2b and 2c is followed, using normal shingling methods. If there is color data appearing in the lower half of the range, the alternative sequence of FIGS. 2b'–2d' is followed, as will be discussed below.

In FIG. 2b, the color array provides a half width swath, and the black array completes half of the available shingle tab of 128 length, to provide a shorter shingle tab of 64 length for subsequent shingling at the color feed rate.

FIG. 2b—Black-only to Color Transition (no color in lower half of initial color range)

Active color nozzle range: 33–64

Active black nozzle range: 1–64

Advance distance after print pass: 64

FIG. 2c illustrates the color steady state mode, in which the color array is fully active, and a similar length of the black array is active.

FIG. 2c—Color Steady State

Active color nozzle range: 1–64

Active black nozzle range: 1–128

Advance distance after print pass: 64

Black-only to Color (normal general graphics mode) alternative case

If the scan shows color data that would appear in the lower half of the color range after the advance of FIG. 2a, the image is printed as shown in FIG. 2b', then advanced only by 4. Although conceptually the advance may be thought of as zero, the slight advance substantially provides most of the benefits of shingling while keeping the 50% density swath within the color range for finishing on the next pass.

FIG. 2b'—Black-only to Color Transition (color in lower half of initial color range)

Active color nozzle range: 3–34

Active black nozzle range: 1–64

Advance distance after print pass: 4

In FIG. 2c', a full color swath is printed to complete the previous path.

FIG. 2c'—Color Steady State

Active color nozzle range: 1–64

Active black nozzle range: 1–128

Advance distance after print pass: 64

If is desired to avoid the alternative steps of FIGS. 2b'–2d', the advance following the first data scan to detect color in the next color print range may be limited to 64. Another alternative to provide faster throughput is to advance 128 only if no color would fall in the lower half of the color range with such an advance (yielding the state shown in FIG. 2b,) otherwise advancing only 64.

Color to Black-only (premium output quality mode)

Figure 3A:
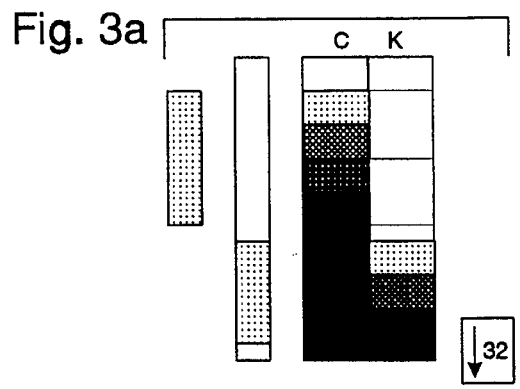
FIGS. 3a–3g are schematic views of an ink jet printer status according to the method of the present invention illustrating sequential steps of printing with premium output quality in a transition from color printing to black-only printing.

In the premium mode, four pass shingling is used for color, and three pass for black, with a print density of 25% for color and 33.3% for black printing. While printing color in the steady state as shown in FIG. 3a, the printer scans the upcoming data to determine if color data will be present anywhere within the color nozzle range on the next pass (i.e. within the range of color nozzles 1–64.) If so, the next pass is printed in the steady state, the sheet is advanced by 64, and the upcoming data is scanned again as before.

FIG. 3a—Color Steady State
Active color nozzle range: 1–64
Active black nozzle range: 17–112
Advance distance after print pass: 32

Figure 3B:
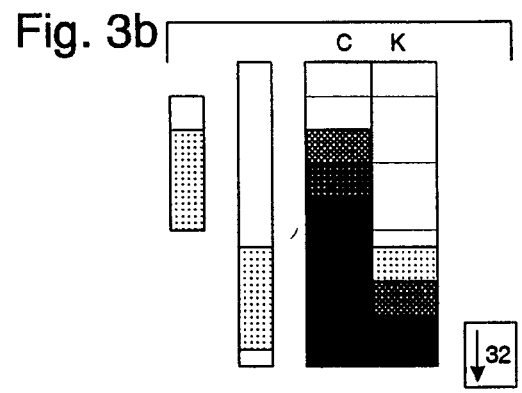

If a data scan does not show color in the next range of color nozzles, then a transition to black only printing may begin. In FIGS. 3b–3d, the color shingling is completed at the color advance rate, while black printing continues as if in the steady state.

FIG. 3b—Color to Black-only Transition
Active color nozzle range: 1–48
Active black nozzle range: 17–112
Advance distance after print pass: 32

FIG. 3c—Color to Black-only Transition
Active color nozzle range: 1–32
Active black nozzle range: 17–112
Advance distance after print pass: 32

FIG. 3d—Color to Black-only Transition
Active color nozzle range: 1–16
Active black nozzle range: 17–112
Advance distance after print pass: 32

Figure 3E:
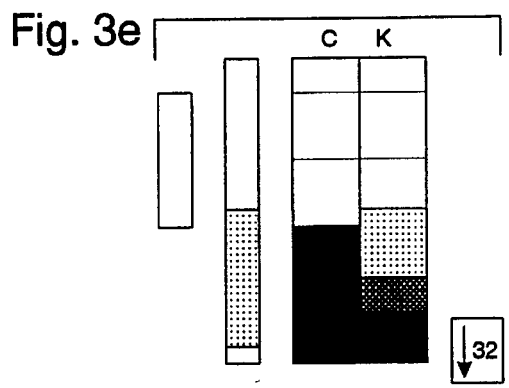
Figure 3C:
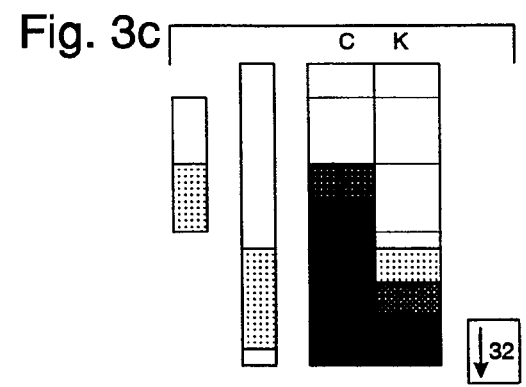
Figure 3F:
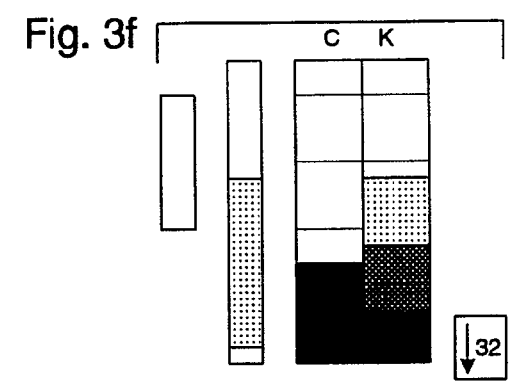
Figure 3D:
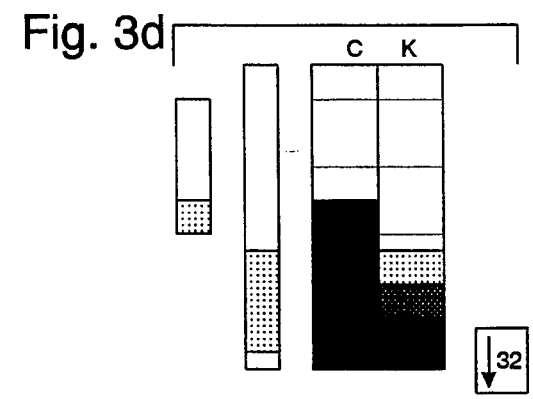
Figure 3G:
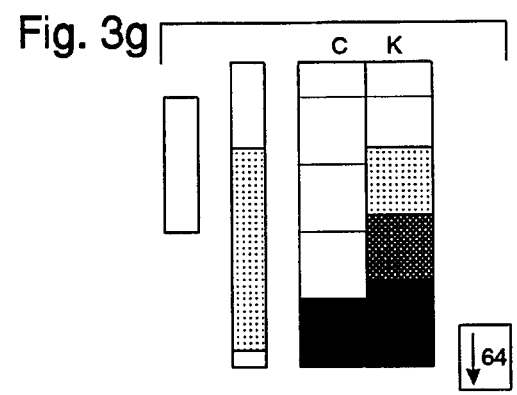

In FIGS. 3e–3g, the active range of the black array is increased upwardly in each step by 32, the amount of the color advance rate. This builds up longer shingle tabs without leaving any partial density gaps or excessively inked regions.

FIG. 3e—Color to Black-only Transition
Active color nozzle range: none
Active black nozzle range: 17–144
Advance distance after print pass: 32

FIG. 3f—Color to Black-only Transition
Active color nozzle range: none
Active black nozzle range: 17–176
Advance distance after print pass: 32

After achieving the black-only steady state, the advance rate proceeds at double the color advance rate until color data is detected as will be discussed below.

FIG. 3g—Black-only Steady State
Active color nozzle range: none
Active black nozzle range: 17–208
Advance distance after print pass: 64

Black-only to Color (premium output quality mode)

In the premium mode, as noted above, four pass shingling is used for color, and three pass for black, with a print density of 25% for color and 33.3% for black printing. While printing color in the black-only steady state, the advance rate is 64 until a transition is indicated. In this mode, The upcoming data is scanned to determine if color data is present that would fall within a range corresponding to the black nozzle range of 128–300 after an advance of 64. If color data is detected in that range, the paper is advanced only 32, as shown in FIG. 4a.

Figure 4A:
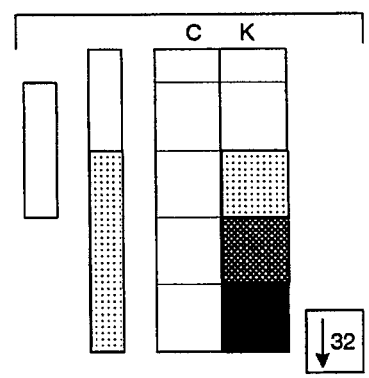
FIGS. 4a–4g are schematic views of an ink jet printer status according to the method of the present invention illustrating sequential steps of printing with premium output quality in a transition from black-only printing to color printing.

FIG. 4a—Black-only Steady State—Transition
Active color nozzle range: none
Active black nozzle range: 17–208
Advance distance after print pass: 32

Figure 4B:
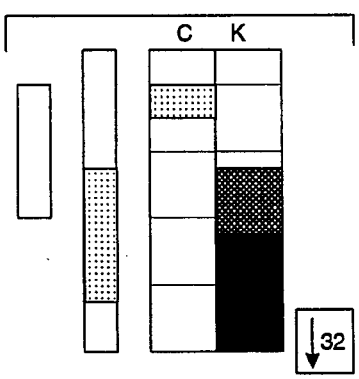
Figure 4E:
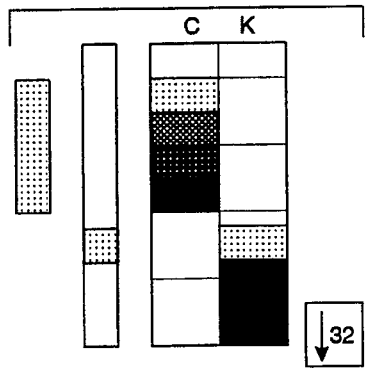

FIGS. 4b–4e show the buildup of a four pass color shingle, with full swath color printing occurring at FIG. 4e and continuing subsequently into the color steady state. The black shingle having shingle tab lengths of 64 is completed in FIGS. 4b and 4c; a new black shingle having shingle tab lengths of 32 is created in FIGS. 4e and 4f.

FIG. 4b—Black-only to Color Transition
Active color nozzle range: 49–64
Active black nozzle range: 49–176
Advance distance after print pass: 32

Figure 4C:
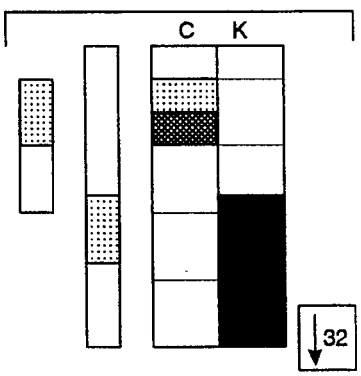

FIG. 4c—Black-only to Color Transition
Active color nozzle range: 33–64
Active black nozzle range: 81–144
Advance distance after print pass: 32

Figure 4F:
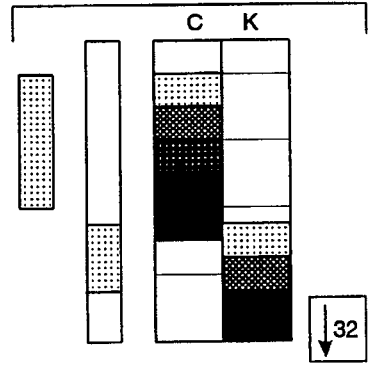
Figure 4D:
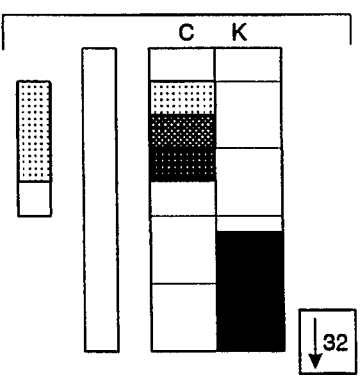

FIG. 4d—Black-only to Color Transition
Active color nozzle range: 17–64
Active black nozzle range: none
Advance distance after print pass: 32

FIG. 4e—Black-only to Color Transition
Active color nozzle range: 1–64
Active black nozzle range: 81–112
Advance distance after print pass: 32

FIG. 4f—Black-only to Color Transition
Active color nozzle range: 1–64
Active black nozzle range: 49–112
Advance distance after print pass: 32

Figure 4G:
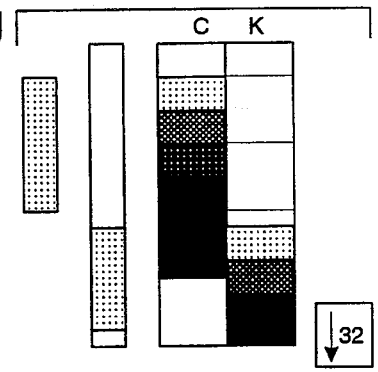

FIG. 4g—Color Steady State
Active color nozzle range: 1–64
Active black nozzle range: 17–112
Advance distance after print pass: 32

Apparatus

Figure 5:
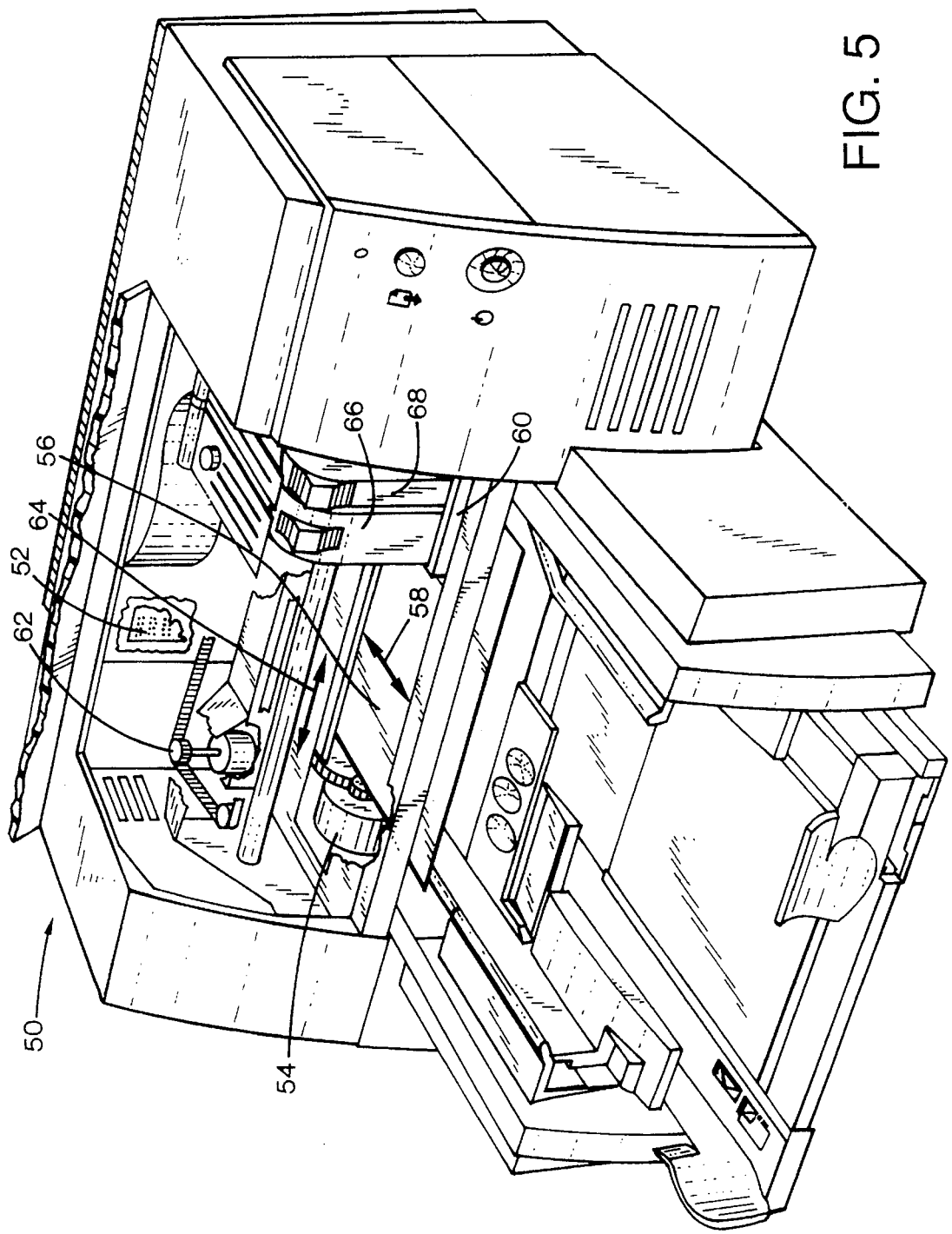
FIG. 5 is a perspective cutaway view of an ink jet printer according to a preferred embodiment of the invention.

FIG. 5 shows an ink jet printer 50 operable for performing the present invention. The printer includes a controller 52 that is connected to receive print data from an external source, convert the print data from a raw image format to a half tone image consisting of instructions as to which pixels are to be printed with which ink colors. The controller is connected to operate an advance mechanism 54. The advance mechanism engages a media sheet 56 and moves it along an advance axis 58 during printing. A carriage is mounted to a scan mechanism 62 that is connected to the controller for reciprocation of the carriage over the sheet 56 along a scan axis 64 perpendicular to the advance axis 58. A color ink cartridge 66 and a black ink cartridge 68 are mounted to the carriage. The color cartridge 66 includes the color print head nozzle array bar 12 on its lower surface, and the black cartridge 68 includes the black print head nozzle array bar 14 on its lower surface.

While the disclosure is discussed in terms of a preferred embodiment, the invention is not intended to be so limited. The principles disclosed herein are applicable to other printer types, and to applications having shingling multiples other than those disclosed.

We claim:

1. A method of generating an image on a printable surface located entirely on a single sheet of print media, from a stream of incoming print data containing data of a first data type for generating an image of a first image type and containing data of a second data type for generating an image of a second image type, the method comprising the steps of:

printing in a first mode;

while printing in the first mode, depositing a first partial density image swath having a first swath width on the printable surface, and printing a second partial density image swath having a second swath width to overlap at least a portion of the first partial density image swath, generating a first shingle tab extending from the first swath having a first length;

after depositing the first swath and the second swath, advancing the surface by a first amount;

while printing in the first mode, scanning incoming print data to determine whether the incoming print data includes the second data type;

if incoming print data includes the second data type, transitioning to a second print mode;

while printing in the second mode, depositing a third partial density image swath having a third swath width different from the second swath width on the printable surface to overlap at least a portion of the first shingle tab, generating a second shingle tab having a second length different from the first length; and after depositing the third swath, advancing the surface by a second amount different from the first advance amount.

2. The method of claim 1 wherein first data type and a corresponding image type, type types comprise color, the second data and image types comprise black only, and wherein the first image swath and second image swath include color, and the third image swath includes black only, and wherein the third swath width and second advance amounts are greater than the second swath width and first advance amounts.

3. The method of claim 1 wherein transitioning includes printing a first transitional swath having a width intermediate the second and third swath widths.

4. The method of claim 1 wherein transitioning includes printing a second transitional swath having a width intermediate the second and third swath widths and different from the width of the first transitional swath.

5. The method of claim 1 wherein the second advance amount is at least double the first advance amount.

6. The method of claim 1 including, after transitioning, scanning incoming print data to determine whether the incoming print data includes the first data type, such that a return to the first print mode is effected.

7. The method of claim 1 including ejecting ink droplets from an ink jet printing mechanism onto the surface.

8. A method of generating an image on a printable surface located entirely on a single sheet of print media, with an ink jet printing mechanism having a black nozzle array of a first length and a color nozzle array of a lesser second length, the method comprising the step of:

printing in color mode by printing overlapping partial density color swaths of color ink droplets onto the surface, the color swaths having a color swath width less than or equal to the second array length;

while printing in color mode, advancing the surface by a color advance amount after each swath;

scanning incoming data to determine whether the image will require color printing on upcoming swaths, or whether it requires only black printing;

if the image requires only black printing, transitioning to black only printing transitioning including printing a transitional black swath having a transitional width greater than the color swath width;

after transitioning, printing in black only mode;

printing in the black only mode comprising printing a full black swath having a width greater than the transitional width.

9. The method of claim 8 including the step: while printing in the color mode, printing black images with only a limited portion of the black array having a length less than or equal to the color array length.

10. The method of claim 8 including the step: while printing in black only mode, maintaining the color array in an inactive state.

11. The method of claim 8 including the step: while printing in the color mode, advancing the surface by a first amount after each swath, and wherein the first advance amount is equal to the color array length divided by the number of partial density color swaths required to generate a full density color image.

12. A printing system that prints on a printable surface located entirely on a single sheet of print media, based on print data, the system comprising:

a controller;

a printable surface advance mechanism in communication with the controller;

a carriage scanning assembly in communication with the controller;

a print head connected to the carriage scanning assembly and in communication with the controller;

the controller being programmed to scan a stream of upcoming print data if the upcoming print data includes color data, operate in a color printing mode including operating the print head for printing with a limited black swath width and operating the advance mechanism at a limited black rate of advance;

while operating in the color printing mode, scan the upcoming print data;

if the upcoming print data includes only black data, initiate a transition to black only printing, the transition including operating the print head for printing with a transitional black swath width greater than the limited swath width, then printing with a full black swath width greater than the transitional swath width and operating the advance mechanism at a full rate of advance greater than the limited rate of advance.

13. The apparatus of claim 12 wherein the print head includes an elongated black array of nozzles having a first length, and an elongated array of color nozzles having a second length less than the first length.

14. The apparatus of claim 13 wherein the first length is at least double the second length, such that the full rate of advance is at least double the limited rate of advance.

15. The apparatus of claim 13 wherein the color nozzle array is parallel to the black nozzle array, and wherein the black nozzle array includes an extending portion extending beyond the color nozzle array by a distance at least equal to the length of the color nozzle array.

16. The apparatus of claim 15 wherein the controller is programmed to deactivate all of the black array except the extending portion when in the color printing mode, such that color and black ink are not printed simultaneously to a common location on the printable surface during a single pass of the print head.

* * * * *